United States Patent [19]

Brandon

[11] 3,829,618

[45] Aug. 13, 1974

[54] LINE USAGE MEASURING CIRCUIT

[75] Inventor: Arthur Cecil Brandon, Denver, Colo.

[73] Assignee: American Telephone and Telegraph Company, New York, N.Y.

[22] Filed: Apr. 5, 1973

[21] Appl. No.: 348,200

[52] U.S. Cl. .......................... 179/8 A, 179/175.2 C

[51] Int. Cl. .......................................... H04m 15/38

[58] Field of Search.... 179/7 R, 7 MM, 81 R, 84 R, 179/175.2 C, 175.24, 8 R, 8 A

[56] References Cited

UNITED STATES PATENTS

| | | | |
|---|---|---|---|
| 3,155,781 | 11/1964 | Ulmer | 179/175.2 C |
| 3,335,231 | 8/1967 | Gray et al. | 179/8 A |
| 3,636,259 | 1/1972 | Karras | 179/8 A |
| 3,639,702 | 2/1972 | Thompson | 179/8 A |

*Primary Examiner*—Kathleen H. Claffy
*Assistant Examiner*—Gerald L. Brigance
*Attorney, Agent, or Firm*—P. M. Enlow; D. A. Marshall

[57] ABSTRACT

A line usage measuring circuit for determining station usage of a telephone line by recording station incoming and outgoing call attempts and call completions routed through a telephone central office. High impedance off-hook and ring detectors are normally bridged across the telephone line. On station generated calls the off-hook detector registers an outgoing call attempt and functions to enable outgoing call completion apparatus. Reversal of the telephone line and answer signals appearing on a sleeve conductor enables the outgoing call completion apparatus to record completions of outgoing calls. The ring detector records telephone central office ringing signals as incoming call attempts and enables the off-hook detector to subsequently record station off-hook signals occurring within a predetermined time interval after ringing signals as incoming call completions.

14 Claims, 5 Drawing Figures

PATENTED AUG 13 1974 3,829,618

SHEET 2 OF 4

LINE USAGE MEASURING CIRCUIT

BACKGROUND OF THE INVENTION

1. Field of the Invention

This invention relates to service observing in communication systems. In particular, it relates to an arrangement for measuring the incoming and outgoing call usage of a telephone line by a telephone station.

2. Description of the Prior Art

In many instances telephone customers desire to be provided with information concerning the type of usage to which their telephone lines are subjected. For example, a telephone customer may be a professional person who depends upon having a telephone line available for incoming calls made by potential clients. If the professional person is aware that the telephone line is primarily being used to place outgoing calls, it may be desirable to limit the number of outgoing calls or to install additional telephone lines in order that better incoming call service may be provided for his potential clients.

In another situation a business being served by a number of telephone lines may desire to be provided with information concerning the usage of their lines. The knowledge that a lot of incoming calls are not being answered may enable a business to initiate procedures to better serve their calling customers. Similarly, usage information disclosing a large number of outgoing calls may indicate that more outgoing telephone lines should be provided for a private branch exchange switching system. Usage information indicating that a large number of call attempts were made to potential customers, who did or did not answer at certain time intervals, could be utilized by a business to establish specific areas and times when prospective customers would be available to receive calls.

Prior art service observing equipment is arranged to monitor outgoing call attempts originated at a telephone station by a calling party and to check the accuracy of dialed digits. Heretofore service observing equipment has also been available for monitoring a telephone station's outgoing call attempts or incoming call attempts. However, service observing equipment that is connected to a telephone line for the purpose of monitoring outgoing call attempts will not respond to an incoming call attempting completion to the telephone station. Similarly, outgoing call attempts are not recorded when the service observing equipment is connected to the telephone line for the purpose of monitoring incoming call attempts.

A need exists in the art for a circuit arranged for monitoring a telephone line to determine the usage made of the telephone line by a telephone station utilized for placing outgoing calls and receiving incoming calls. A need also exists for a line usage measuring circuit arranged for automatically determining both the number of outgoing and incoming call attempts occurring on a telephone line along with the number of outgoing call attempts that are completed to the called party and the number of incoming call attempts answered by the telephone station.

SUMMARY OF THE INVENTION

In the exemplary embodiment of the invention a line usage measuring circuit is provided for monitoring the usage of a telephone line by recording attempts and completions of incoming and outgoing calls of a telephone station coupled to the telephone line. On an outgoing call initiated by a user of the telephone station, the line usage measuring circuit records the telephone station off-hook signal as an outgoing call attempt and the subsequent answer signal returned by the serving telephone central office as an outgoing call completion. The line usage measuring circuit is also arranged to record ringing signals placed on the telephone line by the serving telephone central office as incoming call attempts and the subsequent answer by the called telephone station as a completion of an incoming call.

In accordance with one feature of the invention, high impedance off-hook detector and ring detector apparatus are coupled across the telephone line conductors. The high impedance off-hook detector apparatus is enabled by a station generated off-hook signal appearing on the line conductors to disconnect the ring detector apparatus from across the line conductors and record the off-hook state of the telephone station coupled thereto as an outgoing call attempt.

Another feature of the invention is the provision of answer detector apparatus that is coupled to the telephone line for the purpose of detecting answer signals returned by the serving telephone central office. Answer signals returned after the registering of outgoing calling attempts are recorded as outgoing call completions.

Another feature of the invention is the provision of ring detector apparatus arranged for recording telephone central office ringing signals as incoming call attempts and for enabling off-hook detector apparatus to subsequently record answering telephone station off-hook signals occurring within a predetermined interval of time as incoming call completions.

In accordance with still another feature of the invention, detector apparatus is provided for monitoring incoming call attempts on telephone lines arranged for loop or ground start operation and for recording different types of outgoing call answer signals as outgoing call completions.

BRIEF DESCRIPTION OF THE DRAWING

The foregoing features and advantages, as well as others, of the invention will be more apparent from a description of the drawing, in which.

It will be noted that FIGS. 1, 2, 3, and 4 employ a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the *Americal Institute of Electrical Engineers Transactions, Communications and Electronics*, Volume 74, pages 505 through 513.

GENERAL DESCRIPTION

Figures 1, 5:
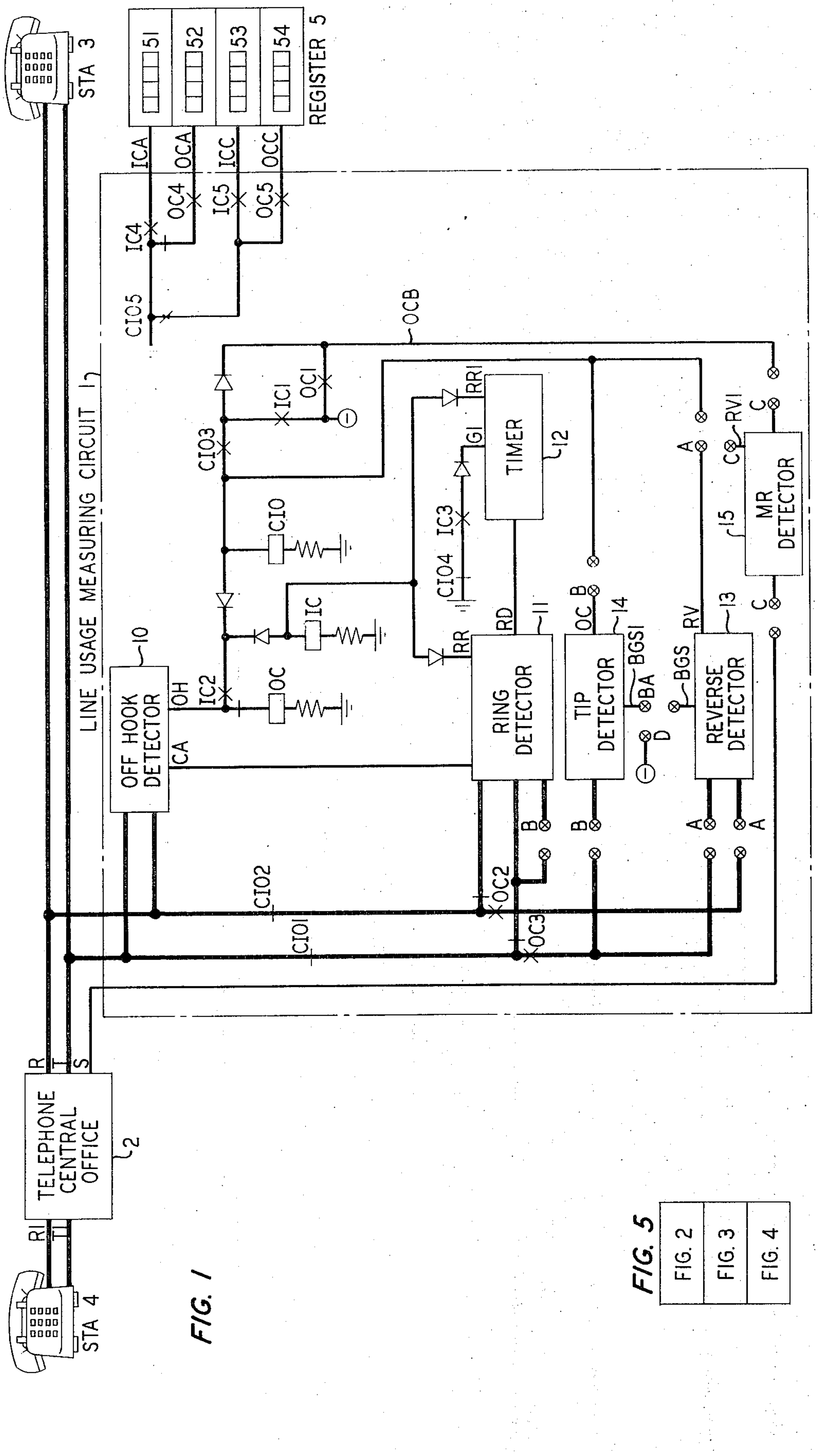
FIG. 1 sets forth a block diagram illustrating the interrelationship of the various components of the exemplary embodiment of the invention.

Referring now to FIG. 1 of the drawing, it is intended that line usage measuring circuit 1, shown thereon, be coupled to the line conductors T and R of a conventional telephone line utilized to connect telephone station 3 with telephone central office 2. The operation of the switchhook, occurring when the receiver of telephone station 3 is removed prior to making an outgoing call, causes a change of potential across the T and R conductors. This change of potential enables off-hook detector 10 to operate relay OC and thereby establish a path over lead OCA through the normally closed, or break, portions of transfer contacts CI05, IC4 and the now closed, or make, contacts OC4 to operate outgoing call attempt register 52. The operation of relay OC also opens the break portion of transfer contacts OC2, OC3 to remove ring detector 11 from across the T and R conductors.

Following seizure of the line by telephone station 3 and the recording of an outgoing call attempt, the user of telephone station 3 dials the directory number digits in the well-known manner of a called telephone station, such as telephone station 4. Telephone central office 2 signals called telephone station 4 by placing ringing signals on line conductors R1 and T1. If called telephone station 4 does not answer, the calling party places telephone station 3 in an on-hook state and line usage measuring circuit 1 has recorded an outgoing call attempt on register 52.

If called telephone station 4 is answered, telephone central office 2 will, depending upon the type of switching system used to serve calling telephone station 3, reverse the polarity of voltage signals normally applied to the T and R conductors, option A, or apply a positive voltage signal to lead S, option C. Assuming that telephone central office 2 has indicated the answer of telephone station 4 by reversing the voltage polarity of conductors T, R, Option A, reverse detector 13 detects the reversed voltage signals appearing on conductors T, R and operates relay CIO over lead RV in response thereto. Operation of relay CIO opens break contacts CIO1, CIO2 to remove reverse detector 13 from across conductors T, R, and closes the make portion of transfer contacts CIO5 to apply ground through previously operated make contacts OC5 to register 54. The resultant operation of register 54 indicates completion of an outgoing call attempt.

When telephone central office 2 is of the type that indicates answer of called telephone station 4 by the application of a positive voltage signal to lead S, option C, MR detector 15 responds by operating relay CIO from battery appearing on lead OCB through make contacts OC1. If the aforementioned manner, operation of relay CIO closes the make portion of transfer contacts CIO5 to provide a path for the operation of outgoing call attempt completion register 54.

On an incoming call, telephone central office 2 applies ringing signals to the T, R conductors to alert telephone station 3. Ring detector 11, connected across the T, R conductors by means of break contacts CIO1, CIO2 and the break portion of transfer contacts OC3, OC2, detects the occurrence of ringing signals and operates relay IC over lead RR. Operation of relay IC closes both make contacts IC3 to turn on timer 12 and the make portion of transfer contacts IC4 to establish an operate path through the break portion of transfer contacts CIO5 for incoming call attempt register 51. Ring detector 11 also applies signals to leads CA and RD to inhibit off-hook detector 10 from turning on during ringing and to reset timer 12 during the ringing cycle.

When telephone station 3 answers an incoming call, telephone central office 2 removes the ringing signals from conductors T, R thereby allowing ring detector 11 to enable off-hook detector 10, via lead CA, to detect the off-hook state of telephone station 3. Off-hook detector 10 responds to the answer of an incoming call by placing a signal on lead OH to hold previously operated relay IC and operate relay CIO through the make portion of transfer contacts IC2. Incoming call completion register 53 then operates over a path to ground through the make portion of transfer contacts CIO5 and make contacts IC5. In addition to establishing an operate path for register 53, relay CIO opens break contacts CIO1, CIO2 to remove ring detector 11 from across conductors T, R and break contacts CIO4 to disable timer 12. When an incoming call is abandoned before answer by called telephone station 3, telephone central office 2 removes the ringing signals from conductors T, R. Subsequently, timer 12 will time out and release previously operated relay IC.

Line usage measuring circuit 1 is also arranged, option B, to measure the line usage by a ground start telephone station. Off-hook detector 10, in the aforementioned manner, operates relay OC to register an outgoing call attempt, remove ring detector 11 from across the T, R conductors, and connect tip detector 14 to line conductor T, option B. Tip detector 14 inhibits operation, via lead BGS1, option BA, of reverse detector 13 until telephone central office 2 acknowledges a request for service by the ground start telephone station. In addition to tip detector 14, line usage measuring circuit 1 is arranged so that ring detector 11 records telephone central office generated ground ring signals appearing on the T conductor of a ground start telephone station line as incoming call attempts.

In summary, line usage measuring circuit 1 is arranged to monitor the usage of a telephone line by recording attempts and completions of both incoming and outgoing calls of a telephone station coupled to the telephone line.

DETAILED DESCRIPTION

1. Outgoing Call Attempt

Figure 2:
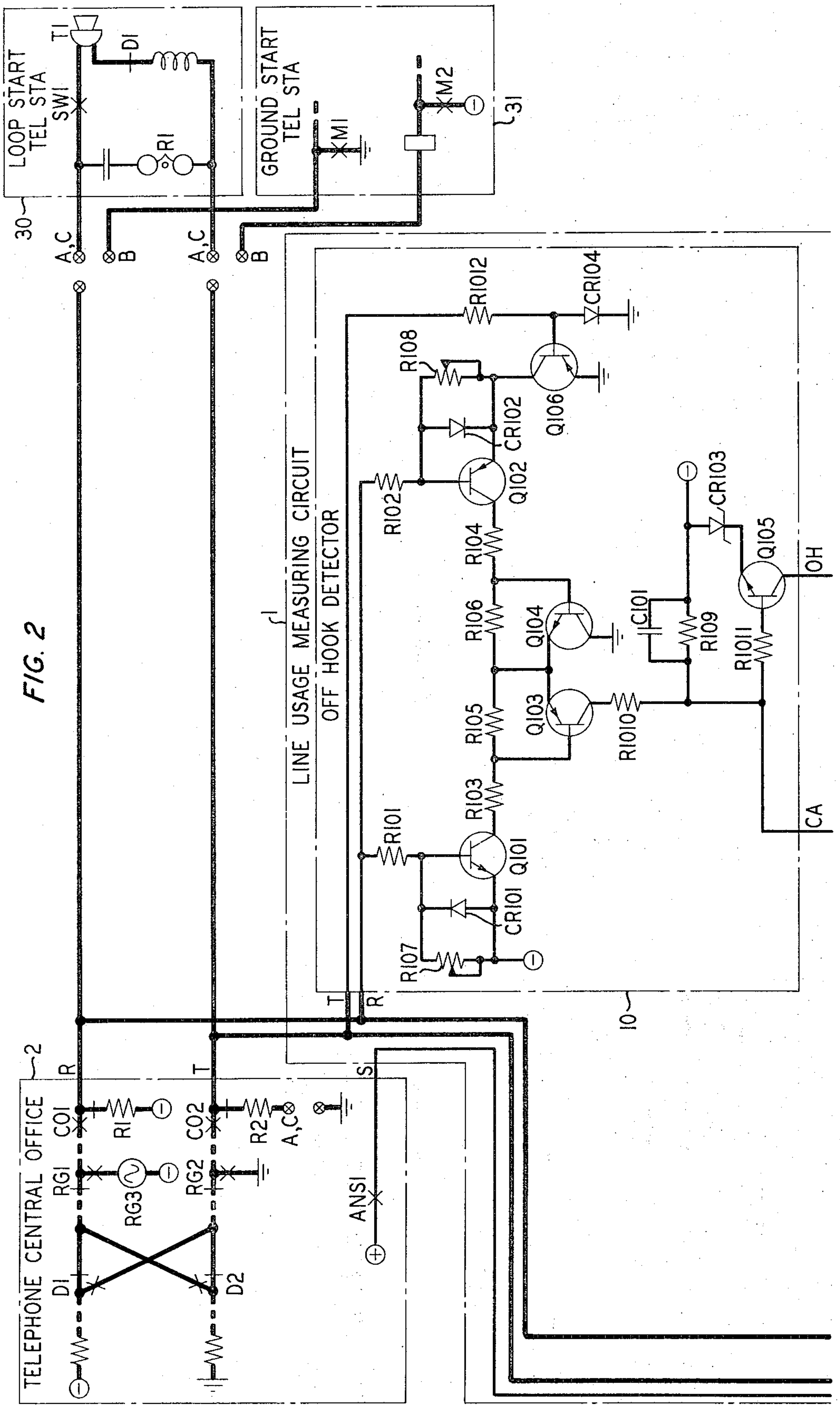
FIGS. 2, 3, and 4, when arranged in accordance with FIG. 5, set forth with greater particularity the circuit details of the components comprising the exemplary embodiment.

A serving telephone central office, such as telephone central office 2, FIG. 2, normally applies ground, option A, C, and battery through the break portion of transfer contacts CO2, CO1 to the line conductors T, R coupled with loop start telephone station 30, option A, C. When loop start telephone station 30, is in the idle, or on-hook state, switchhook contacts SW1 are released, thereby maintaining an open across line conductors T, R to prevent the flow of line current.

Figure 3:
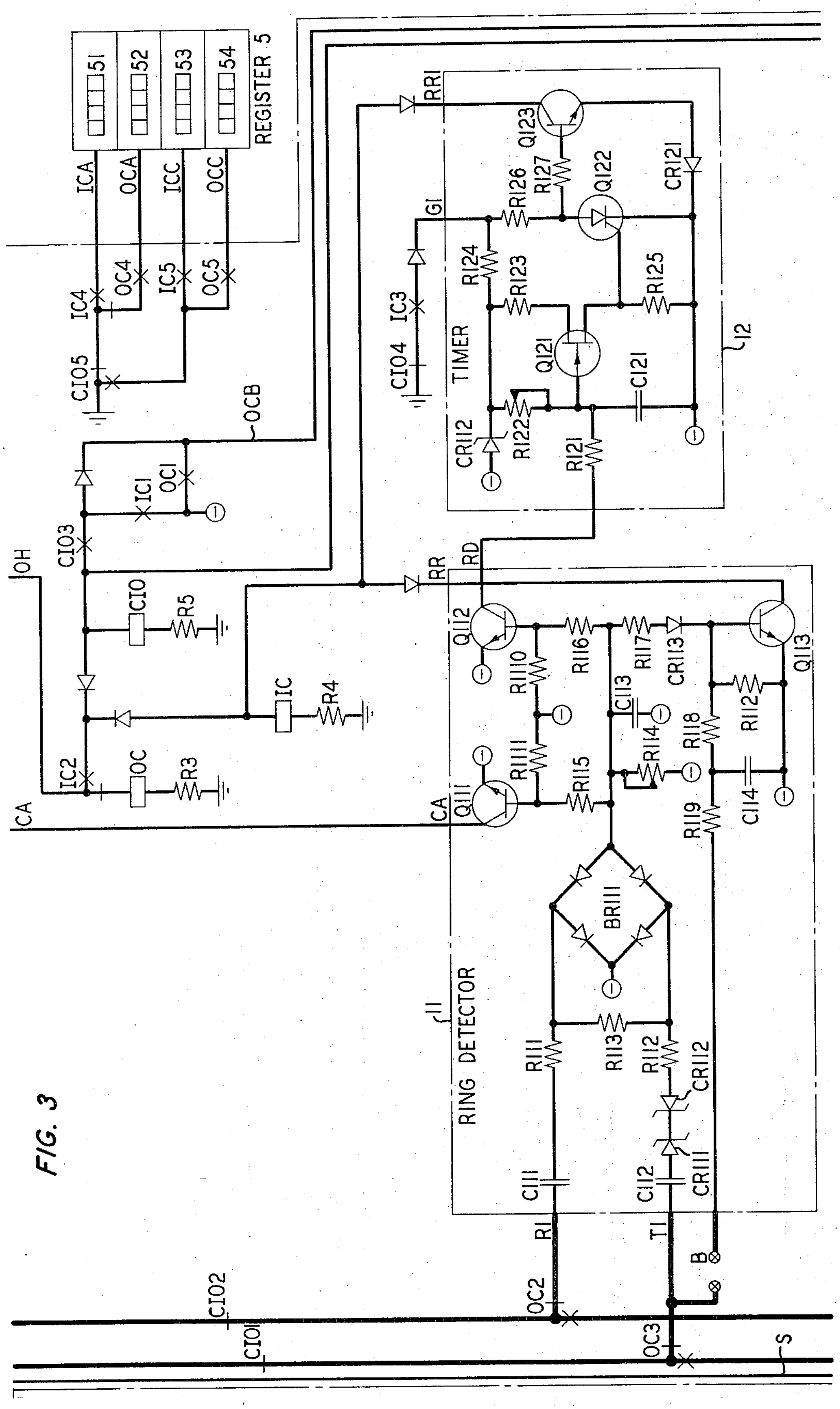
Figure 4:
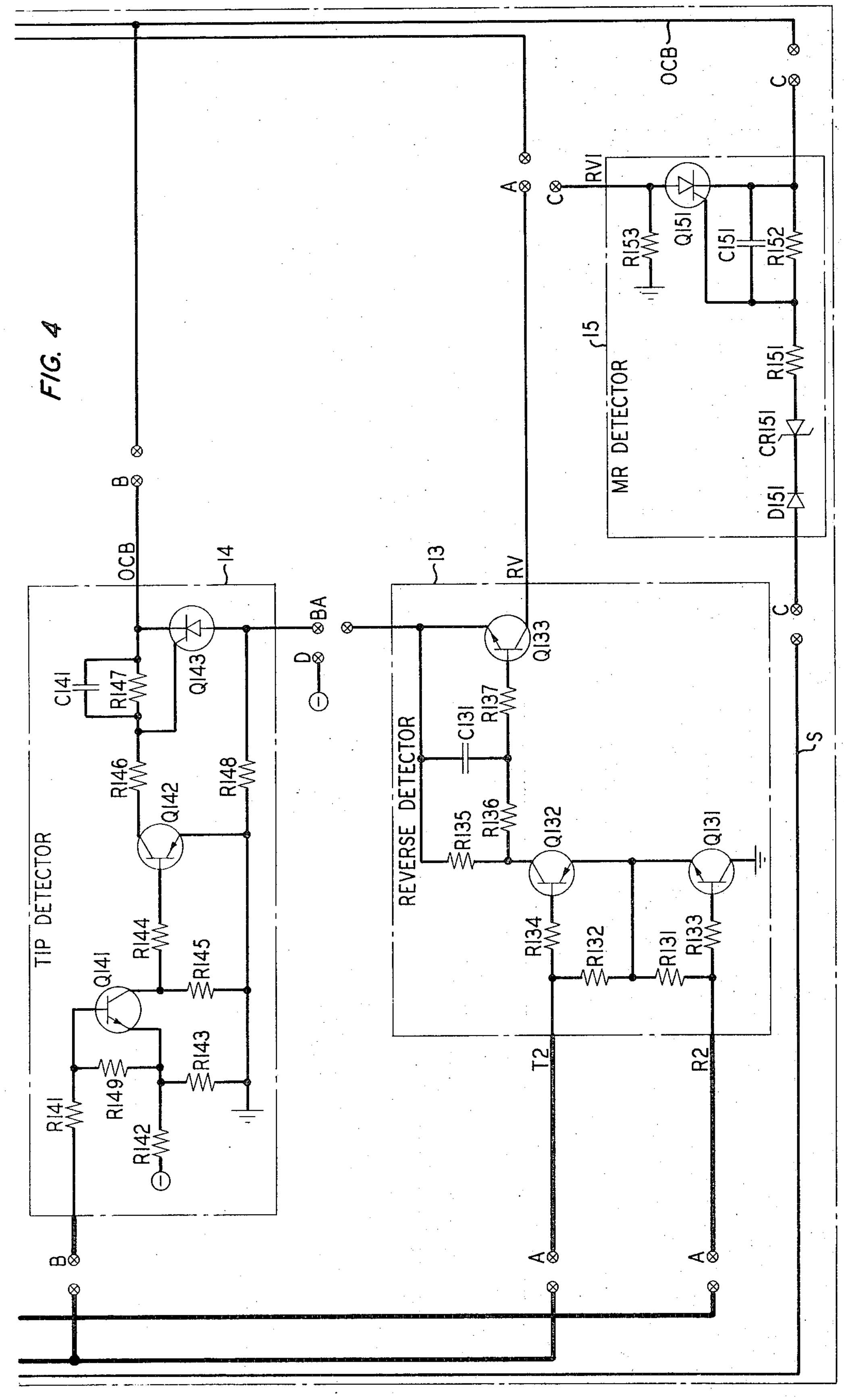

Line usage measuring circuit 1, FIGS. 2, 3, and 4, is arranged so that off-hook detector 10, FIG. 2, and ring detector 11, FIG. 3, via the break portion of transfer contacts OC2, OC3 and break contacts CIO1, CIO2, are normally bridged across the line T, R conductors. When loop start telephone station 30 is in the on-hook state, the battery, FIG. 2, placed on line conductor R by telephone central office 2 appears on the base of off-hook detector 10 transistors Q101 and Q102. Similarly, the ground appearing on conductor T is applied to the base of transistor Q106. Since the emitter of Q106 is returned to ground and the emitters of Q101, Q102 returned to battery, the ground and battery appearing on conductors T, R, respectively, reverse bias these transistors to their off states.

A calling party located at loop start telephone station 30 initiates an outgoing call attempt by removing the transmitter and receiver in the well-known manner to close switchhook contacts SW1. The closing of make contacts SW1 connects a conducting path through the dial break contacts D1 across the line T, R conductors. Current then flows from ground through resistance R2 over line conductor T, through break contacts D1, make contacts SW1, line conductor R and resistance R1 to battery. The resultant voltage drop across resistance R1 increases the voltage appearing on conductor R to a point that forward-bias transistors Q101 and Q102 to their conducting state. Similarly, the voltage drop across resistance R2 causes a decreased voltage to be applied to conductor T that forward-biases transistor Q106. Consequently, transistor Q106 turns on and current flows from ground through the emitter-collector of transistors Q106, Q102, series resistance R104, R106, R105, R103, and the emitter-collector of transistor Q101 to battery.

The current flow through resistors R106, R105 develops voltages that forward-bias transistors Q104, Q103 and allows current to flow from ground through the emitter-collector circuits of transistors Q104, Q103, resistor R1010, and the parallel combination of resistor R109 and capacitor C101 to battery. After a short delay, caused by the charging of capacitor C101, a voltage is developed across resistor R109 to forward-bias transistor Q105. Q105 conducts and establishes a path for the operation of relay OC, FIG. 3, from ground through resistor R3, the winding of relay OC, the break portion of transfer contacts IC2, over lead OH, through the emitter-collector of conducting transistor Q105, FIG. 2, and zener diode CR103 to battery. Relay OC in operating closes make contacts OC4, FIG. 3, to establish a path for applying ground through the break portion of transfer contacts C105, IC4 to register 52. Register 52 operates and thereby records removal of the transmitter and receiver of loop start telephone station 30 by a calling party as an outgoing call attempt.

In summary, off-hook detector 10 records the initial off-hook state of a calling telephone station coupled to the telephone line as an outgoing call attempt on register 52. Registors R101, R102, R1012, FIG. 2, located in the base circuit of transistors Q101, Q102, Q106, respectively, are of the order of 680K ohms and ensure that the input of off-hook detector 10 appears as a high impedance across telephone line conductors T, R. Sensitivity of off-hook detector 10 can be adjusted by the variable resistors R107, R108 located in the base-emitter circuits of transistors Q101, Q102. The voltage appearing across capacitor C101 holds transistor Q105 operated during the dialing interval when conductors T, R are momentarily opened by dial contacts D1, thereby ensuring that each dial pulse is not recorded as an outgoing call attempt.

2. Outgoing Call Completion

After the calling party has placed loop start telephone station 30 in the off-hook state, telephone central office 2 closes the make portion of transfer contacts CO1, CO2 and in the well-known manner returns dial tone to the calling party. The calling party proceeds to dial the called telephone station directory number digits and is connected through telephone central office 2 with the called telephone station. During dialing and connection intervals, resistance battery is applied to conductor R and resistance ground is applied to conductor T by the switching apparatus of telephone central office 2, herein represented by the break portions of relays D1, D2 and the make portions of relays CO1, CO2.

Reverse detector 13, FIG. 4, option A, is provided when the switching apparatus of telephone central office 2 is arranged to detect the answer of a called telephone station by reversing the resistance battery and resistance ground normally applied to conductors R, T. Following the operation of relay OC, FIG. 3, by off-hook detector 10, the make portion of transfer contacts OC3, OC2 connects reverse detector 13 through break contacts CIO1, CIO2 across calling line conductors T, R. Resistance ground and resistance battery appearing on input leads T2 and R2 of reverse detector 13, FIG. 4, cause a current flow in resistors R132, R131 of such a direction as to reverse-bias transistors Q132, Q131. Consequently, these transistors remain in the non-conducting state during the dialing and connection intervals.

When the called party answers, the switching apparatus of telephone central office 2, FIG. 2, operates contacts D1, D2 to connect conductor T to resistance battery and conductor R to resistance ground. The resistance battery and resistance ground, now appearing on leads T2 and R2, respectively, FIG. 4, create a voltage drop across resistors R131, R132 that operates to forward-bias transistors Q131, Q132. The flow of current from ground through the collector-emitter of forward-biased transistors Q131, Q132 and resistors R135, R136 to battery, option D, enables capacitor C131 to charge and forward-bias transistor Q133. With transistor Q133 forward-biased, battery, option D, is applied to lead RV to operate relay CIO, FIG. 3, which locks operated through make contacts CIO3 to battery previously applied to lead OCB through make contacts OC1. Operation of relay CIO opens break contacts CIO1, CIO2 to remove reverse detector 13 from across line conductors T, R and to provide an operate path for outgoing call completion register 54 through make contacts OC5 and the make portion of operated transfer contacts CIO5.

MR detector 15, FIG. 4, option C, is connected to sleeve conductor S of a telephone line, FIG. 2, when the switching apparatus of telephone central office 2 is arranged to detect the answer of a called party by applying positive battery to sleeve conductor S. When the called party answers, telephone central office 2, equipped with this type of switching apparatus, applies positive battery to sleeve conductor S instead of reversing the voltage potential applied to telephone line conductors T, R. The positive battery appearing on sleeve conductor S, FIG. 4, causes a voltage to be developed across capacitor C151 that forward-biases semiconductor device Q151. Q151 conducts and provides a current path from ground through resistor R5, FIG. 3, the winding of relay CIO over lead RV1, option C, and through conducting Q151 to the battery appearing on lead OCB. Relay CIO operates and, in the aforementioned manner, records the answer of an outgoing call attempted over telephone line conductors T, R as an outgoing call completion on register 54. The closing of make contacts CIO3 establishes a hold path for relay CIO to battery appearing on lead OCB and enables the turn off of semiconductor device Q151.

Off-hook detector 10 detects the on-hook state of loop start telephone station 30 at the end of an outgoing call and returns to the idle condition by reverse-biasing Q105 to release relay OC, FIG. 3. If the outgoing call attempt has been answered by a called party, the release of relay OC opens make contacts OC1 to remove battery from lead OCB and thereby allow relay CIO to release.

INCOMING CALL ATTEMPT

On an incoming call intended for idle loop start telephone station 30, FIG. 2, telephone central office 2 enables switching apparatus, herein represented as make contacts RG1, RG2, to connect ring generator RG3 and ground, in the well-known manner, to the called telephone line. The ringing current appearing on conductors T, R is applied through break contacts CIO1, CIO2, FIG. 3, and the break portion of transfer contacts OC2, OC3 to the input of ring detector 11. During the ringing cycle, current flows through capacitors C111, C112, zener diode CR111, CR112, and resistors R111, R112, R113. Current flowing through resistor R113 develops a voltage that is applied to the input of bridge rectifier BR111. The output of bridge rectifier BR111 develops a voltage across a filter comprised of potentiometer R114 and capacitor C113 that is utilized to forward-bias transistors Q111, Q112, Q113.

The filter output voltage appearing across resistors R117, R112 enables transistor Q113 to establish a path from ground through resistor R4, the winding of relay IC, and the collector-emitter of transistor Q113 to battery. Current flowing through the winding operates relay IC to close make contacts IC4 and apply ground through the break portion of transfer contacts CIO5 to enable register 51 to record an incoming call attempt.

In addition to forward-biasing transistor Q113, the voltage appearing across variable resistor R114 and capacitor C113 develops a current flow through resistors R116, R1110 and R115, R1111 to forward-bias transistors Q112 and Q111, respectively. The enabling of transistor Q112 applies a battery signal to lead RD for resetting timer 12 to an initial timing state by discharging capacitor C121. Operation of relay IC closes make contacts IC3 to enable timer 12 by connecting a ground through normal contacts CIO4 with lead G1. The ground appearing on lead G1 forward-biases transistor Q123, which conducts and establishes a holding path for relay IC by establishing a current path over lead RR1 through the collector-emitter of transistor Q123 and diode CR121 to battery.

Forward-biased transistor Q111 conducts during the ringing interval and applies a battery signal to lead CA for the purpose of reverse-biasing transistor Q105, FIG. 2. Thus, off-hook detector 10 is thereby prevented from operating during the ringing interval and incorrectly registering ringing signals as incoming call completions.

In summary, ring detector 11 detects ringing signals applied to a telephone line and records them as an incoming call attempt intended for a called telephone station coupled to the telephone line. In addition, ring detector 11 resets timer 12 to an initial timing state and inhibits off-hook detector 10 from responding to the ringing signal.

INCOMING CALL COMPLETION

A called party, located at loop start telephone station 30, FIG. 2, answers an incoming call by closing switchhook make contacts SW1 to place a conducting path across line conductors T, R. The switching apparatus of telephone central office 2 responds, in the well-known manner, by releasing transfer contacts RG1, RG2 to remove ringing current from line conductors T, R and to connect them to resistance ground and resistance battery through the break portion of transfer contacts D2, D1, respectively.

Removal of the ringing current from line conductors T, R enables ring detector 11, FIG. 3, to remove the bridge generating voltage from across variable resistor R114 and capacitor C113. Transistor Q111 thereby becomes reverse-biased and removes battery from lead CA. Off-hook detector 10, FIG. 2, responds to the resistance ground and resistance battery appearing on line conductors T, R by forward-biasing transistor Q105 in the aforementioned manner. Following the removal of battery from lead CA by ring detector 11, transistor Q105 conducts and establishes an operate path, FIG. 3, for relay CIO from ground, through resistor R5, the winding of relay CIO, the make portion of transfer contacts IC2, and the collector-emitter of Q105 to battery. Relay CIO locks operated to battery apearing through series make contacts CIO3, IC1 and opens break contacts CIO4 to inhibit subsequent operation of timer 12. The removal of ground from lead G1 reverse-biases transistor Q123 and thereby interrupts current flow over lead RR1 to relay IC. Relay IC does not release at this time in that the conduction of transistor Q105, FIG. 2, has previously provided a hold path for current flowing through the coil winding of relay IC.

Operation of relay CIO also closes the make portion of transfer contacts CIO5, FIG. 3, to apply ground through make contacts IC5 to incoming call completion register 53. Incoming call completion register 53 thereby operates and records the closing of the switchhooks of called loop telephone station 30 as the completion of an incoming call attempt.

Telephone central office 2 is arranged to apply interrupted ringing current to line conductors T, R. During the silent interval when ringing current is not present on leads T1, R1, transistors Q111, Q112, Q113 of ring detector 11 are reverse-biased to the nonconducting state. When battery is removed from lead RD, capacitor C121 of timer 12 begins to charge through variable resistor R122, which has a value of approximately 500K ohms. While capacitor C121 is charging, conducting transistor Q123 continues to hold relay IC operated over lead RR1 even through transistor Q113 of ring detector 11 is in the nonconducting state. If switchhook contacts SW1, FIG. 2, of called loop start telephone station 30 are closed during the silent interval, off-hook detector 10 will operate in the aforementioned manner to forward-bias transistor Q105 and provide operate and hold paths for relays CIO and IC, respectively. At the end of the silent interval, the reappearance of ringing current enables ring detector 11 to reset timer 12 and inhibit operation of off-hook detector 10 by applying battery to leads RD and CA.

If the incoming call is not answered, the calling party disconnects, thereby directing the switching apparatus of telephone central office 2, FIG. 2, to remove ringing current from line conductors T, R and release transfer contacts CO1, CO2. Since switchook contacts SW1 of loop start telephone station 30 are open, the ground and battery appearing on conductors T, R inhibit operation of off-hook detector 10 wherein transistor Q105 is maintained in a nonconducting state. After an interval of time, capacitor C121, FIG. 3, is enabled by the removal of battery from lead RD to charge to a voltage potential sufficient to forward-bias semiconductor device Q121. The current flowing through conducting Q121 develops a voltage across resistor R125 that enables semiconductor device 122 to conduct and thereby reverse-bias transistor Q123. With transistors Q105, FIG. 2, and Q123, FIG. 3, in the nonconducting state, previously operated relay IC is released after having initiated the registration of an incoming call attempt.

After an incoming call has been answered, the called party, located at loop start telephone station 30, FIG. 2, initiates a disconnect by opening switchhook contacts SW1. The switching apparatus of telephone central office 2 responds by releasing transfer contacts CO1, CO2 to place ground and battery on line conductors T, R. Off-hook detector 10 responds to the ground and battery by reverse-biasing transistor Q105 to interrupt the current flow to the winding of relay IC, FIG. 3. Relay IC releases and opens break contacts IC1 to release relay CIO.

In summary, ringing signals appearing on the telephone line conductors enable ringing detector 11 of line usage measuring circuit 1 to initiate registration of an incoming call attempt. Ring detector 11 also resets timer 12 and prevents off-hook detector 10 from operating during the ringing sequence. Answer of the ringing signals by the telephone station within a predetermined interval of time is registered as an incoming call completion. If the incoming call is not answered within the time interval, timer 12 initiates the return of line usage measuring circuit 1 to the idle state.

GROUND START TELEPHONE STATIONS

Ground Start private branch exchange trunks, herein represented by ground start telephone station 31, FIG. 2, option B, are arranged to receive battery from telephone central office 2 on conductor R and to transmit battery on conductor T when in the idle state. Battery appearing on conductor R reverse-biases transistor Q101 and inhibits operation of off-hook detector 10.

When a party at ground start telephone station 31 initiates an outgoing call, ground is applied through apparatus, herein represented by make contacts M1, to conductor R. The resultant rise in voltage appearing on conductor R in combination with the battery appearing on conductor T enables off-hook detector 10, in the aforementioned manner, to operate relay OC, FIG. 3, and record the outgoing call as an outgoing call attempt on register 52.

The operation of relay OC operates transfer contacts OC2, OC3 to connect tip detector 14, FIG. 4, option B, to conductor T and reverse detector 13, option A, across conductors T, R. The rise of voltage on conductor R, along with the battery on conductor T, appears as a reversal of line voltage to reverse detector 13. However, the battery appearing on conductor T from ground start telephone station 31, option B, maintains transistors Q141, Q142 of tip detector 14 in the nonconducting state. Consequently, semiconductor device Q143 is maintained in the nonconducting state, thereby preventing the operation, option BA, of transistor Q133 in reverse detector 13.

Telephone central office 2, FIG. 2, responds to the outgoing call attempt generated by ground start telephone station 31 by operating transfer contacts CO1, CO2 and connecting resistance ground and resistance battery to conductors T, R through the break portion of transfer contacts D2, D1. The subsequent voltage rise appearing on conductor T forward-biases transistor Q141, FIG. 4, of tip detector 14, which, in turn, enables transistor Q142 to conduct and establish a current flow through resistor R147. The voltage drop appearing across resistor R147 forward-biases semiconductor device Q143 and thereby enables the battery appearing on lead OCB to be applied, option BA, to the emitter of transistor Q133. When the called party answers, reverse detector 13 responds to the reversal of voltage potential across conductors T, R, in the aforementioned manner, by operating relay CIO to initiate registration of an outgoing call completion on register 54.

On an incoming call intended for ground start telephone station 31, telephone central office 2 applies ground to line conductor T. This ground applied through the break portion of transfer contacts OC3, FIG. 3, enables capacitor C114 of ring detector 11 to charge to a voltage sufficient to forward-bias transistor Q113 and thereby provide an operate path over lead RR for relay IC. Relay IC, in the aforementioned manner, enables register 51 to record an incoming call attempt and off-hook detector 10, via the make portion of transfer contacts IC2, to operate relay CIO in response to the answer ground signal subsequently applied to conductor R through make contacts M1.

SUMMARY

It is obvious from the foregoing that the facility, economy, and efficiency of a telephone line may be subsequently enhanced by the provision of apparatus arranged to measure the usage of the line by a telephone station utilized for placing outgoing calls and receiving incoming calls. It is further obvious from the foregoing that the aforesaid line usage measuring circuit arrangement for automatically determining both the number of outgoing and incoming call attempts occurring on the telephone line, and the number of outgoing and incoming call attempts that are completed by a telephone station coupled to the line, alleviates the need to provide one type of service observing equipment for monitoring incoming calls and another type for monitoring outgoing calls.

While the apparatus of the invention has been disclosed for use in directing a register to record outgoing and incoming call attempts and completions, it is to be understood that such an embodiment is intended to be illustrative of the principles of the invention and that numerous other arrangements may be devised by those skilled in the art without departing from the spirit and scope of the invention.

For example, the present line usage measuring circuit could be used with a general purpose processor arranged for controlling a plurality of the circuits to record outgoing and incoming call attempts and completions for a number of telephone lines. In addition to registering incoming and outgoing call attempts and completions, the present line usage measuring circuit could be used with the general purpose processor to record the time intervals required to answer incoming and outgoing calls and the time interval of the conversations. Such information may be utilized to establish a billing rate on the basis of a station's actual use of a telephone line in lieu of a monthly service charge.

What is claimed is:

1. A circuit for determining usage of a telephone line by ascertaining station call attempts and call completions routed through a telephone central office comprising means for detecting station generated off-hook signals and registering ones of the off-hook signals as outgoing call attempts, means enabled by said detecting and registering means for recording answer signals generated by the telephone central office as outgoing call completions, and means for recording telephone central office generated ringing signals as incoming call attempts and enabling said detecting and registering means to record ones of the station generated off-hook signals occurring within a predetermined time interval as incoming call completions.

2. The circuit set forth in claim 1 wherein said detecting and registering means comprises a first relay, and means bridged across the telephone line and enabled by the station generated off-hook signals for operating said first relay in response to initial ones of the station off-hook signals.

3. The circuit set forth in claim 2 wherein said recording means comprises a second relay, and means coupled to the telephone line and enabled by the telephone central office answer signals for activating said second relay in response thereto.

4. The circuit set forth in claim 3 wherein said recording and enabling means comprises a third relay, timing means for defining the predetermined time interval and for establishing a holding path for said third relay during the time interval, bridge means coupled to the telephone line through break contacts of said first relay for generating enabling signals in response to the central office ringing signals, means enabled by a first one of said enabling signals for enabling operation of said third relay, means enabled by each of said enabling signals for directing said timing means to initiate the predetermined time interval, and means enabled by each of said enabling signals for inhibiting said operating means from operating in response to the ringing signals.

5. The circuit set forth in claim 4 further including means including make and break contacts of said first, second, and third relays for generating signals identifying the incoming and outgoing call attempts and call completions.

6. A circuit for determining station usage of a multiconductor telephone line by ascertaining incoming and outgoing call attempts and call completions for a station connected by the telephone line to a telephone central office comprising means bridged across a first two of the conductors for detecting station generated off-hook signals and registering ones of the off-hook signals as outgoing call attempts, means coupled to the telephone line and enabled by said detecting and registering means for recording answer signals generated by the telephone central office as outgoing call completions, and means coupled to the first two conductors by said detecting and registering means for recording central office generated ringing signals as incoming call attempts and for enabling said detecting and registering means to subsequently record ones of the station generated off-hook signals occurring within a predetermined time interval as incoming call completions.

7. The circuit set forth in claim 6 wherein said detecting and registering means comprises a first relay, a first transistor having its collector-to-emitter path serially inserted in the operate path of said first relay, a plurality of transistors having their base paths connected to ones of the first two conductors and their collector-to-emitter paths serially connected between ground and a battery source, and a pair of transistors enabled by current flowing through the collector-to-emitter paths of said plurality of transistors for forward-biasing said first transistor to operate said first relay.

8. The circuit set forth in claim 7 wherein said recording means comprises a second relay, first circuit apparatus connected through first make contacts of said first relay across the first two conductors for operating said second relay in response to ones of the answer signals appearing on the first two conductors, second circuit apparatus connectable to a third one of the conductors for operating said second relay in response to ones of the answer signals applied to the third conductor, and means including first make contacts of said second relay in combination with second make contacts of said first relay for holding said second relay operated under control of said first relay.

9. The circuit set forth in claim 8 wherein said recording and registering means comprises a third relay, timing circuit apparatus enabled by operation of said third relay for defining the predetermined time interval and for establishing a holding path for said third relay during the predetermined time interval, bridge circuit apparatus coupled across the first two conductors through series first break contacts of said first and said second relays for generating enabling signals in response to the central office ringing signals, a second transistor connected to said bridge circuit and connectable to one of the first two conductors for operating said third relay in response to a first one of the enabling signals and a first one of the central office ringing signals, a third transistor connected to said bridge circuit and enabled by each of the enabling signals for directing said timing circuit apparatus to initiate the predetermined time interval, and a fourth transistor connected to said bridge circuit and enabled by each of the enabling signals for reverse-biasing and first transistor to its nonconducting state during occurrence of the ringing signals.

10. The circuit set forth in claim 9 further including third circuit apparatus connectable to the one first conductor for inhibiting said first circuit apparatus from operating in response to premature ones of the answer signals appearing on the first two conductors.

11. The circuit set forth in claim 9 further including a first output lead for indicating the outgoing call attempts including third make contacts of said first relay in series combination with second break contacts of said second relay and first break contacts of said third relay.

a second output lead for indicating the outgoing call completions including fourth make contacts of said first relay in series combination with second make contacts of said second relay, a third output lead for indicating the incoming call attempts including first make contacts of said third relay in series combination with said second break contacts of said second relay, and a fourth output lead for indicating the incoming call completions including second make contacts of said third relay in series combination with said second make contacts of said second relay.

12. A line usage measuring circuit for determining station usage of a multiconductor telephone line by ascertaining incoming and outgoing call attempts and call completions for loop and ground start telephone stations connected by the telephone line to a telephone central office comprising a plurality of relays each having make contacts and break contacts, first transistor means bridged across a first two of the telephone line conductors for detecting station generated off-hook signals and operating a first one of said relays in response to ones of the off-hook signals, second transistor means connected across the two conductors through first make contacts of said first relay and first break contacts of a second one of said relays for operating said second relay in response to telephone central office generated answer signals appearing on the two conductors, first conduit means connectable to a third one of the telephone line conductors for operating said second relay in response to ones of the answer signals appearing on the third conductor, timing means enabled by the operation of a third one of said relays for establishing a holding path for said third relay for a predetermined interval of time, bridging means bridged across the two conductors through first break contacts of said first relay and said first break contacts of said second relay for generating enabling signals in response to telephone central office generated ringing signals appearing on the two conductors, a first transistor connected to said bridging means and connectable to one of the two conductors for operating said third relay in response to a first one of the enabling signals and one of the ringing signals appearing on the one conductor, a second transistor connected to said bridging means and enabled by each one of the enabling signals for inhibiting said first transistor means from operating said second relay during occurrence of the ringing signals, a third transistor connected to said bridging means and enabled by each one of the enabling signals for directing said timing means to initiate the predetermined interval of time, means including first make contacts of said third relay for enabling said first transistor means to operate said second relay in response to ones of the off-hook signals occurring within the predetermined interval of time, and means enabled by operation of said first, second, and third relays for generating signals identifying the incoming and outgoing call attempts and call completions for the loop and ground start telephone stations.

13. A line usage measuring circuit having a three conductor input connectable to telephone line conductors normally having a negative potential appearing on a first line conductor and a ground potential appearing on a second line conductor and arranged for ascertaining incoming and outgoing call attempts and call completions for a telephone station coupled to the telephone line conductors comprising means connected to a first two of the input conductors for detecting decreases in the voltage potential normally appearing across the first and second telephone line conductors and registering ones of the decreases of voltage potential as outgoing call attempts, means coupled to the first two input conductors and enabled by said detecting and registering means for recording reversals of the voltage potential normally appearing across the first and second telephone line conductors as outgoing call completions, means coupled to the first two input conductors by said detecting and registering means for detecting ringing signals appearing on the first and second telephone line conductors and recording the ringing signals as incoming call attempts, and means for enabling said detecting and registering means to record ones of the decreases of voltage potential occurring within a predetermined interval of time following the ringing signals as incoming call completions.

14. The line usage measuring circuit set forth in claim 13 further including means connected to a third one of the input conductors for registering an answer voltage potential appearing on a third one of the telephone line conductors as an outgoing call completion, and means connected to one of the first two input conductors for inhibiting said recording means from operating in response to premature ones of the voltage potential reversals appearing across the first and second telephone line conductors.

* * * * *